United States Patent
Fu et al.

(10) Patent No.: US 11,808,678 B2
(45) Date of Patent: Nov. 7, 2023

(54) SYSTEM FOR DEEP-SEA PLANKTONIC MICROORGANISM IN-SITU CONCENTRATION, TEMPERATURE MAINTAINING AND PRESSURE MAINTAINING SAMPLING

(71) Applicant: QINGDAO UNIVERSITY OF SCIENCE AND TECHNOLOGY, Qingdao (CN)

(72) Inventors: Ping Fu, Qingdao (CN); Junfei Wu, Qingdao (CN); Siyang Wu, Qingdao (CN); Yang Bai, Qingdao (CN); Yuting Zhou, Qingdao (CN); Guangxu Luan, Qingdao (CN); Shuo Yin, Qingdao (CN); Mingsai Zhang, Qingdao (CN); Chenxu Wang, Qingdao (CN)

(73) Assignee: QINGDAO UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/715,306

(22) Filed: Apr. 7, 2022

(65) Prior Publication Data
US 2023/0065786 A1   Mar. 2, 2023

(30) Foreign Application Priority Data
Sep. 2, 2021   (CN) .......................... 202111026931.5

(51) Int. Cl.
G01N 1/14   (2006.01)
G01N 1/34   (2006.01)
G01N 1/10   (2006.01)

(52) U.S. Cl.
CPC ................. *G01N 1/34* (2013.01); *G01N 1/14* (2013.01); *G01N 2001/1031* (2013.01); *G01N 2001/1062* (2013.01)

(58) Field of Classification Search
CPC .... G01N 1/34; G01N 1/14; G01N 2001/1031; G01N 2001/1062; G01N 1/10;
(Continued)

(56) References Cited

FOREIGN PATENT DOCUMENTS

| CN | 111351684 A | * | 6/2020 | |
| CN | 112461597 A | * | 3/2021 | ............... G01N 1/10 |

* cited by examiner

*Primary Examiner* — Robert R Raevis
(74) *Attorney, Agent, or Firm* — Zhigang Ma

(57) ABSTRACT

A system for a deep-sea planktonic microorganism in-situ concentration, temperature maintaining and pressure maintaining sampling is provided and includes a sampling cylinder body with double layer structures, the sampling cylinder body is provided with a plug-shaped inner cavity, the plug-shaped inner cavity is provided with a transfer water outlet and a water inlet connected to a water inlet component, the plug-shaped inner cavity is connected to an end cover, the plug-shaped inner cavity is connected to a filter part, the sampling cylinder body is provided with a sampling water outlet, the sampling water outlet is respectively connected to a pressure maintaining device and a water outlet pipe, a temperature maintaining material layer and a temperature control component are connected between the double layer structures, and the temperature control component is electrically connected to a controller. The system can complete sampling on the premise of maintaining in-situ pressure of samples.

10 Claims, 6 Drawing Sheets

(58) Field of Classification Search
CPC ............ G01N 2001/1418; G01N 1/12; G01N 2001/1006; C12M 1/267
USPC ...... 73/863, 863.01, 863.11, 863.12, 863.21, 73/863.23, 863.25, 863.71, 864.34, 73/864.51, 864.63, 864.64, 864.65, 73/864.66, 864.67, 864.91
See application file for complete search history.

SYSTEM FOR DEEP-SEA PLANKTONIC MICROORGANISM IN-SITU CONCENTRATION, TEMPERATURE MAINTAINING AND PRESSURE MAINTAINING SAMPLING

TECHNICAL FIELD

The disclosure relates to the field of a deep-sea planktonic microorganism sampling, in particular to a system for a deep-sea planktonic microorganism in-situ concentration, temperature maintaining and pressure maintaining sampling.

BACKGROUND

Deep-sea planktonic microorganisms are a new kind of deep-sea resources. The research on the deep-sea planktonic microorganisms is of great significance in many aspects, such as the origin of life, biology, the research and development of new drugs, environmental protection and so on. However, due to the limitation of its environment, sampling is difficult. A deep-sea sampler of the related art is limited by the volume of a sampling cylinder. In the deep sea where the density of microorganisms is low, only a small number of microbial samples can be obtained in one single sampling, and it is difficult to maintain the in-situ pressure of the samples.

In view of the shortcomings of the sampler of the related art, the disclosure designs a novel system for the deep-sea planktonic microorganism in-situ concentration, temperature maintaining and pressure maintaining sampling, which is loaded with a temperature detector to facilitate the real-time monitoring of the temperature change in the transfer process, so as to ensure that there is no pollution, temperature and pressure sudden change in the transfer process.

SUMMARY

The purpose of the disclosure is to provide a novel system for the deep-sea planktonic microorganism in-situ concentration, temperature maintaining and pressure maintaining sampling to solve the problems existing in the above-mentioned related art.

In order to achieve the above purpose, the disclosure provides the following solutions: a system for a deep-sea planktonic microorganism in-situ concentration, temperature maintaining and pressure maintaining sampling is provided and includes: a sampling cylinder body with double layer structures, the sampling cylinder body is fixedly provided with a plug-shaped inner cavity therein, a top of the plug-shaped inner cavity is provided with a transfer water outlet and a water inlet, the water inlet is connected to a water inlet component, the top of the plug-shaped inner cavity is fixedly connected to an end cover, the end cover is provided with two through holes, the two through holes respectively correspond to the transfer water outlet and the water inlet, the plug-shaped inner cavity is fixedly connected to a filter part, a bottom of the sampling cylinder body is provided with a sampling water outlet, the sampling water outlet are respectively connected to a pressure maintaining device and a water outlet pipe; a temperature maintaining material layer and a temperature control component are fixedly connected between the double layer structures of the sampling cylinder body, and the temperature control component is electrically connected to a controller.

In an embodiment, the controller is a KSD301 sealed waterproof controller.

In an embodiment, the sampling cylinder body includes an inner cylinder and an outer cylinder, the inner cylinder is fixedly connected to the plug-shaped inner cavity, and the temperature maintaining material layer is disposed between the outer cylinder and the inner cylinder.

In an embodiment, the plug-shaped inner cavity includes a top plate and a side plate fixedly connected to the top plate, an inner wall of the inner cylinder is provided with a stepped groove, the top plate is matched with the stepped groove and fixedly connected to the inner cylinder, the filter part is disposed on a bottom end of the plug-shaped inner cavity and fixedly connected to the side plate. The stepped groove is clamped with the plug-shaped inner cavity to enhance the stability of the system.

In an embodiment, the top plate is fixedly connected to the end cover, the end cover is fixedly connected to an inner cavity fixing ring in a circumferential direction, and the inner wall of the inner cylinder is provided with a groove matched with the inner cavity fixing ring. The inner cavity fixing ring is clamped in the groove to make the stability of the plug-shaped inner cavity be higher, and the plug-shaped inner cavity will not slip from above.

In an embodiment, the water inlet assembly includes a water inlet filter, an end of the water inlet filter is fixedly connected to a filter screen, the other end of the water inlet filter is fixedly connected to a deep-water pump, and the deep-water pump is connected to the water inlet, a pressure measuring element is fixedly installed on a pipeline between the deep-water pump and the water inlet. The setting of the filter screen can prevent the garbage in the ocean from being sucked into the plug-shaped inner cavity and affect the normal operation of the system. The pressure measuring element can timely understand the pressure change inside the sampling cylinder body for timely adjustment.

In an embodiment, one-way solenoid valves are fixedly disposed on the transfer water outlet, the water inlet and the water outlet pipe, and a two-way solenoid valve is fixedly connected between the pressure maintaining device and the sampling water outlet. In the sampling process, the one-way solenoid valve connected between the water inlet and the transfer water outlet is opened, which can make the seawater enter the water inlet and flow out from the transfer water outlet, which is convenient for the microbial filter membrane to filter the microorganisms, and prevent the backflow of seawater from interfering with the normal operation of the system.

In an embodiment, the filtering part includes a microbial filter membrane, a microbial filter membrane fixing ring is fixed at a bottom of an outer wall of the plug-shaped inner cavity, and the microbial filter membrane is located between the microbial filter membrane fixing ring and a bottom of the plug-shaped inner cavity, the microbial filter membrane fixing ring is fixedly connected to the bottom of the outer wall of the plug-shaped inner cavity through screws. This can increase the stability of microbial filter membrane and prevent it from being washed away by seawater.

In an embodiment, the temperature control component includes a plurality of temperature sensors, and the plurality of temperature sensors are located between the temperature maintaining material layer and the outer wall of the inner cylinder. It can monitor the temperature in real time and ensure the activity of microbial samples and enzymes.

In an embodiment, the temperature sensor is a TPT300V infrared temperature sensor.

In an embodiment, the side wall of the top plate is provided with a sealing groove at a circumferential direction, and an inner cavity sealing ring is fixedly arranged in the sealing groove.

In an embodiment, the pressure maintaining device is an accumulator capable of maintaining a pressure stability of the sampling cylinder body. As an energy storage element and pressure compensation device, the accumulator can continuously compensate the pressure in the sampling cylinder body without pressure sudden change through charging hydraulic pressure in advance to ensure the activity of the samples. When the sampling process is completed, all valves are closed, and the accumulator can stably maintain the pressure in the sampling cylinder body at the original pressure to achieve the pressure maintaining effect.

In an embodiment, a material of the temperature maintaining material layer is a zirconia ceramic powder.

The beneficial effects of the disclosure are as follows:

1. The user controls the opening of the water inlet and the sampling water outlet, the water inlet assembly is used to pump a large amount of seawater into the sampling cylinder body to filter it through the filtering part. The deep-sea planktonic microorganisms in the seawater are intercepted in the sampling cylinder body through the filtering part, and the rest of the seawater is discharged out of the sampling cylinder body to realize the pollution-free concentration sampling process.

2. By filling the pressure maintaining device with hydraulic pressure in advance and connecting the sampling cylinder body to the pressure maintaining device, the disclosure realizes continuous pressure compensation in the sampling cylinder body without pressure sudden change, and ensures the activity of the samples. When the sampling process is completed, the pressure maintaining device can stably maintain the pressure in the sampling cylinder body at the original pressure to achieve the pressure maintaining effect.

3. By adopting the sampling cylinder body with double layer structures and filling the temperature maintaining material layer and the temperature control component between the double layer structures, the disclosure can ensure that the temperature is basically in a constant state, and can monitor the temperature in real time to ensure the activity of microbial samples and enzymes.

BRIEF DESCRIPTION OF THE DRAWINGS

In order to more clearly explain the embodiments of the disclosure or the technical solutions in the related art, the following will briefly introduce the drawings to be used in the embodiments. It is obvious that the drawings described below are only some embodiments of the disclosure. For those skilled in the art, other drawings can be obtained according to these drawings without paying creative work.

DESCRIPTION OF REFERENCE NUMERALS

Figure 1:
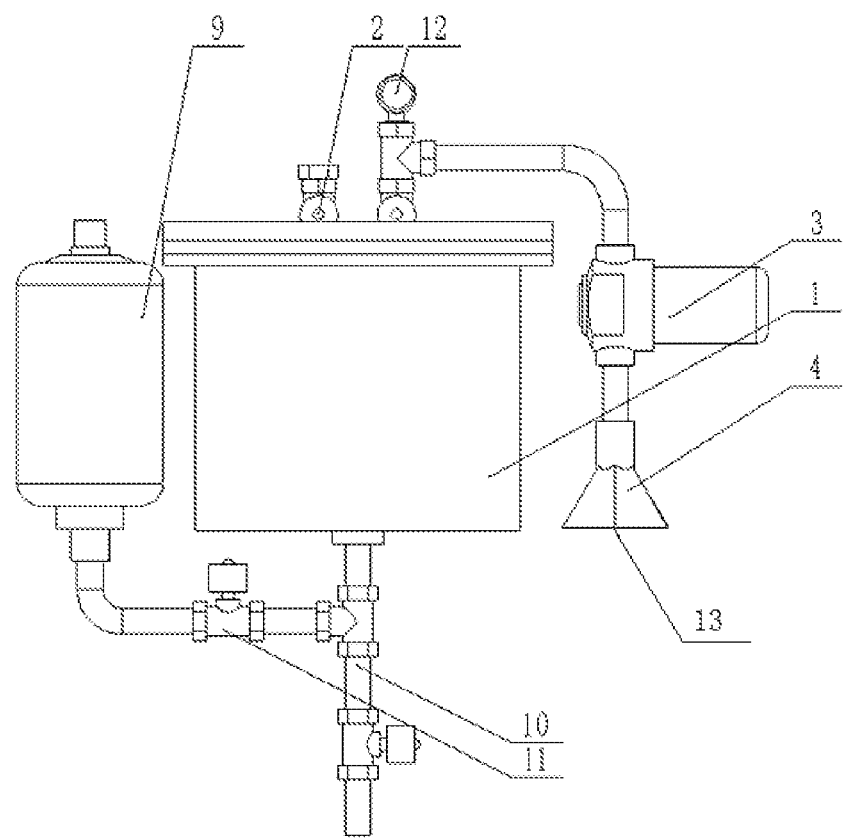
FIG. 1 is a schematic structural view of a system according to an embodiment of the disclosure.
Figure 2:
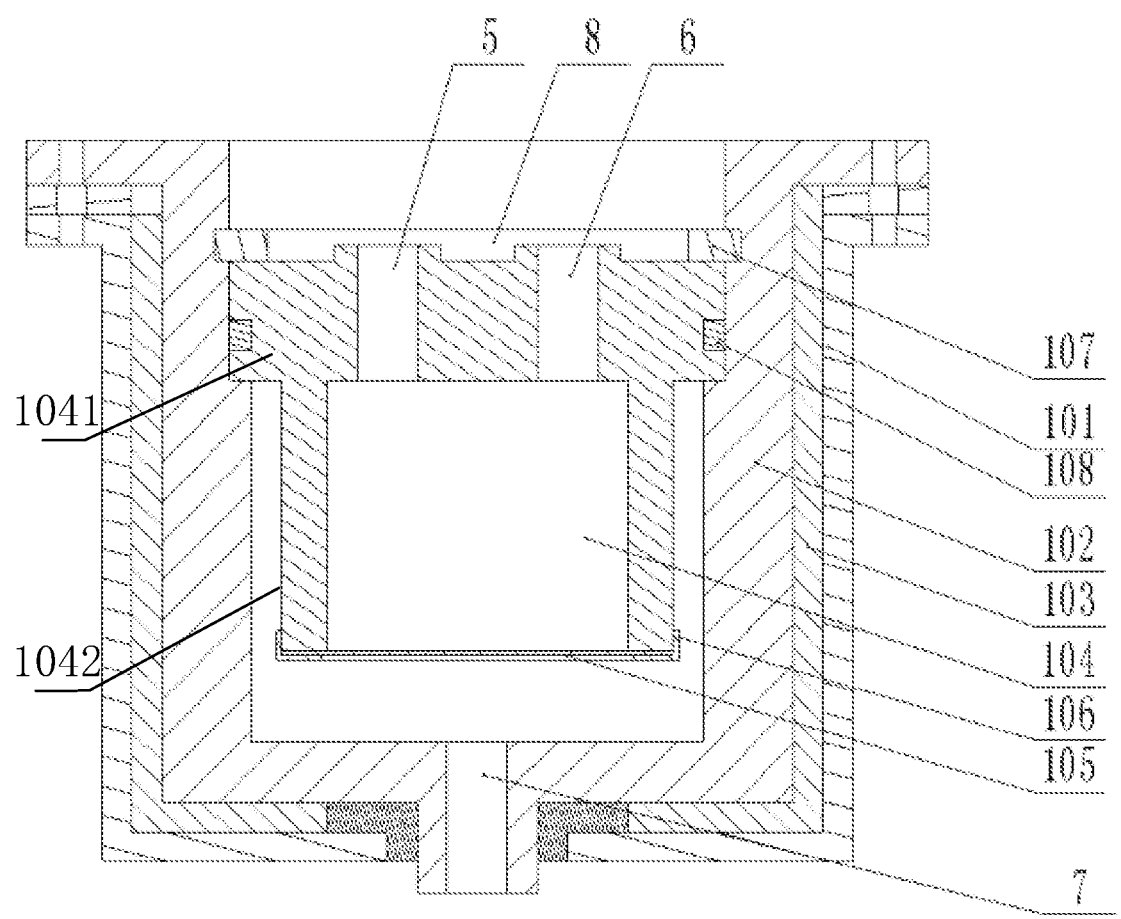
FIG. 2 is a schematic structural view of a sampling cylinder body according to an embodiment of the disclosure.
Figure 3:
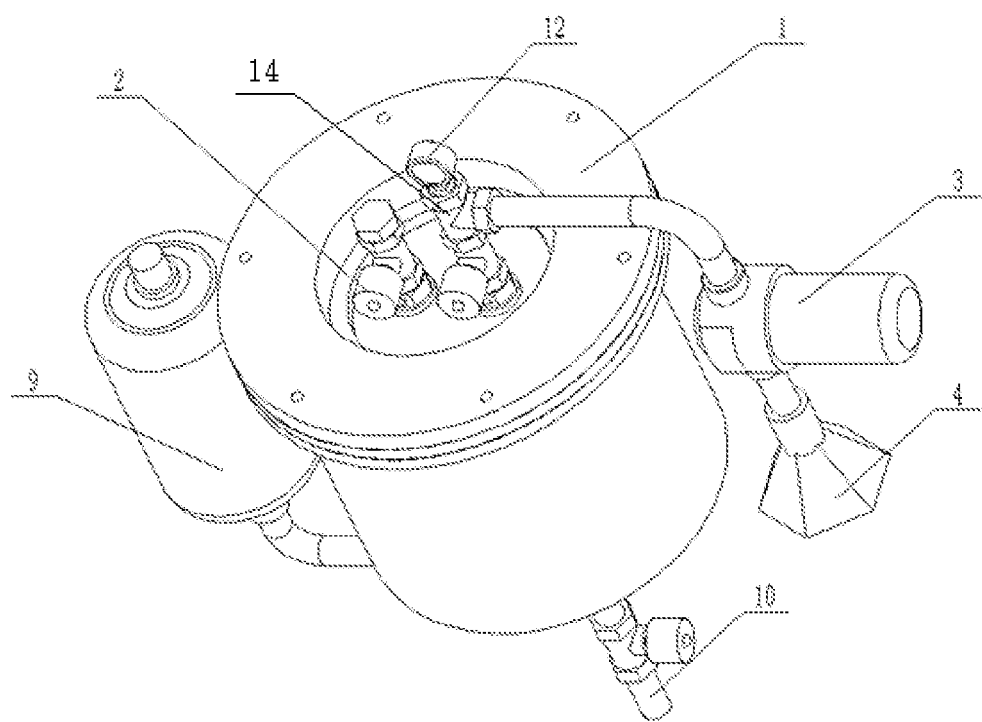
FIG. 3 is a schematic structural view of the system according to an embodiment of the disclosure.

1—sampling cylinder body, 2—one-way solenoid valve, 3—deep-water pump, 4—water inlet filter, 5—transfer water outlet, 6—water inlet, 7—sampling water outlet, 8—end cover, 9—pressure maintaining device, 10—water outlet pipe, 101—outer cylinder, 102—inner cylinder, 103—temperature maintaining material layer, 104—plug-shaped inner cavity, 1041—top plate, 1042—side plate, 105—microbial filter membrane, 106—microbial filter membrane fixing ring, 107—inner cavity fixing ring, 108—inner cavity sealing ring, 11—two-way solenoid valve, 12—pressure measuring element, 13—filter screen, 14—pipeline, 15—temperature sensor, 20—controller.

DETAILED DESCRIPTION OF THE EMBODIMENTS

The technical solutions in the embodiments of the disclosure will be clearly and completely described below in combination with the attached drawings in the embodiments of the disclosure. Obviously, the described embodiments are only part of the embodiments of the disclosure, not all of the embodiments. Based on the embodiments of the disclosure, all other embodiments obtained by those skilled in the art without making creative work belong to the protection scope of the disclosure.

In order to make the above purposes, features and advantages of the disclosure more obvious, and easy to understand, the disclosure is described in further detail below in combination with the accompanying drawings and specific embodiments.

Embodiment 1

As shown in FIGS. 1-3 and 6, the embodiment of the disclosure provides a novel system for a deep-sea planktonic microorganism in-situ concentration, temperature maintaining and pressure maintaining sampling. The system includes a sampling cylinder body 1 with double layer structures, the sampling cylinder body 1 is fixedly provided with a plug-shaped inner cavity 104 therein, a top of the plug-shaped inner cavity 104 is provided with a transfer water outlet 5 and a water inlet 6, the water inlet 6 is connected to a water inlet component, the top of the plug-shaped inner cavity 104 is fixedly connected to an end cover 8, and the end cover 8 is provided with two through holes. The two through holes respectively correspond to the transfer water outlet 5 and the water inlet 6, the plug-shaped inner cavity 104 is fixedly connected to a filter part, a bottom of the sampling cylinder body 1 is provided with a sampling water outlet 7, and the sampling water outlet 7 is respectively connected to a pressure maintaining device 9 and a water outlet pipe 10.

A temperature maintaining material layer 103 and a temperature control component are respectively fixedly connected between the double layer structures of the sampling cylinder body 1, and the temperature control component is electrically connected to a controller 20. A large amount of seawater is pumped into the sampling cylinder body 1 through the water inlet assembly, and then flows out through the sampling water outlet 7 after filtering by the filter part. High concentration deep-sea microbial samples are obtained in the plug-shaped inner cavity 104 to realize in-situ concentrated sampling. The continuous pressure compensation without pressure sudden change in the sampling cylinder body 1 is realized by charging hydraulic pressure in advance through the pressure maintaining device 9 and connecting the sampling cylinder body 1 with the pressure maintaining device 9 to ensure the activity of the samples. The problem that the existing sampler is limited by the volume of the sampling cylinder is solved. In the sea area with low microbial density, a single sampling can obtain a large number of microbial samples and maintain the in-situ pressure of the samples.

In an embodiment, the sampling cylinder body 1 includes an inner cylinder 102 and an outer cylinder 101, the inner cylinder 102 is fixedly connected to the plug-shaped inner cavity 104, and the temperature maintaining material layer 103 is located between the outer cylinder 101 and the inner cylinder 102.

In an embodiment, the plug-shaped inner cavity 104 includes a top plate and a side plate fixedly connected to the top plate. A step groove is arranged on an inner wall of the inner cylinder 102, the top plate is matched with the step groove and fixedly connected to the inner cylinder 102. The filter part is located at the bottom end of the plug-shaped inner cavity 104 and fixedly connected to the side plate. By clamping the top plate in the step groove, the stability between the plug-shaped inner cavity 104 and the inner cylinder 102 is increased.

In an embodiment, the top plate is fixedly connected to the end cover 8, the end cover 8 is fixedly connected to the inner cavity fixing ring 107 in a circumferential direction, and the inner wall of the inner cylinder 102 is provided with a groove matching with the inner cavity fixing ring 107. By clamping the inner cavity fixing ring 107 in the groove and cooperating with the clamping of the step groove, the plug-shaped inner cavity 104 is fixed inside the inner cylinder 102, so as to improve the stability of the overall structure.

In an embodiment, the water inlet assembly includes a water inlet filter 4, an end of the water inlet filter 4 is fixedly connected to a filter screen 13, the other end of the water inlet filter 4 is fixedly connected with a deep-water pump 3, the deep-water pump 3 is connected to the water inlet 6, and a pressure measuring element 12 is fixedly installed on a pipeline 14 between the deep-water pump 3 and the water inlet 6. The seawater is pumped through the deep-water pump 3, and the seawater is simply filtered through the water inlet filter 4 to prevent the marine garbage from being pumped into the plug-shaped inner cavity 104 and affecting the filtration of microorganisms.

In an embodiment, one-way solenoid valves 2 are fixedly arranged on the transfer water outlet 5, the water inlet 6 and the water outlet pipe 10, and a two-way solenoid valve 11 is fixedly connected between the pressure maintaining device 9 and the sampling water outlet 7. During the sampling process, the one-way solenoid valve 2 connected between the water inlet 6 and the transfer water outlet 5 is opened, which can make the seawater enter the water inlet and flow out from the transfer water outlet, which is convenient for the microbial filter membrane 105 to filter the microorganisms, and prevent the backflow of seawater from interfering with the normal operation of the system.

In an embodiment, the filtering part includes a microbial filter membrane 105, the bottom of the outer wall of the plug-shaped inner cavity 104 is fixed with a microbial filter membrane fixing ring 106, the microbial filter membrane 105 is located between the microbial filter membrane fixing ring 106 and the bottom of the plug-shaped inner cavity 104, and the microbial filter membrane fixing ring 106 is fixedly connected to the bottom of the outer wall of the plug-shaped inner cavity 104 through screws. The microbial filter membrane 105 is fixed through the microbial filter membrane fixing ring 106, thus the microbial filter membrane 105 will not be washed away by the pumped seawater, resulting in the inability to filter the seawater and interfering with the normal operation of the system.

Figure 6:
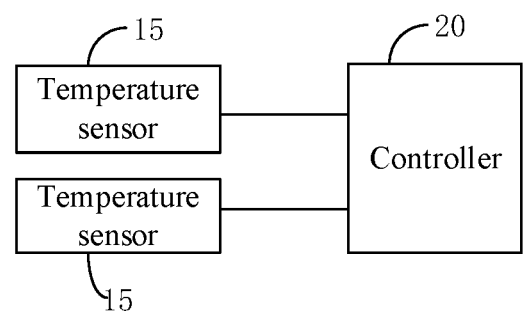
FIG. 6 is a schematic view of connections of a controller and temperature sensors according to an embodiment of the disclosure.

In an embodiment, as shown in FIG. 6, the temperature control assembly includes a plurality of temperature sensors 15, the plurality of temperature sensors 15 are located between the temperature maintaining material layer 103 and the outer wall of the inner cylinder 102. Timely understanding the temperature change inside the sampling cylinder body 1, which can ensure that the temperature is basically in a constant state, and ensure the activity of microbial samples and enzymes. The disclosure does not limit the specific number of the temperature sensors.

In an embodiment, the side wall of the top plate is provided with a sealing groove at a circumferential direction, and an inner cavity sealing ring 108 is fixedly arranged in the sealing groove. Ensuring the tightness between the plug-shaped inner cavity 104 and the inner cylinder 102, and preventing the seawater from flowing out of the plug-shaped inner cavity 104 from the gap between the plug-shaped inner cavity 104 and the inner cylinder 102. At the same time, the gap between the plug-shaped inner cavity 104 and the inner cylinder 102 will cause the pressure to change with the external pressure, so the in-situ pressure cannot be guaranteed.

In an embodiment, the pressure maintaining device 9 is an accumulator that can maintain the pressure stability of the sampling cylinder body 1. After the sampling is completed, the system needs to be transferred from the high-pressure deep sea to the cabin or land. Since the pressure is decreasing during the rise of the system, in order to maintain the original pressure in the sampling cylinder body 1, the accumulator is connected, and the accumulator timely compensates the pressure in the sampling cylinder body 1.

In an embodiment, a material of the temperature maintaining material layer 103 is a zirconia ceramic powder.

In an embodiment, the side plate and bottom of the plug-shaped inner cavity 104 are not in contact with the inner wall of the inner cylinder 102.

In an embodiment, a stepped sealing ring is fixedly arranged between the inner cylinder 102 and the outer cylinder 101. The stepped sealing ring is located at the bottom of the temperature maintaining material layer, which can enhance the tightness and prevent seawater from entering the temperature maintaining material layer.

Working process of the embodiment: when sampling in the deep sea, the one-way solenoid valve 2 connecting the water inlet 6 to the inner direction of the sampling cylinder body 1 and the one-way solenoid valve 2 connecting the transfer water outlet 5 to the outer direction of the sampling cylinder body 1 are opened, the deep-water pump 3 is started, a large amount of seawater flows into the sampling cylinder body 1, the large amount of seawater are filtered by the microbial filter membrane 105 and flows out through the sampling water outlet 7 below the sampling cylinder body 1, a high concentration of deep-sea microbial samples are retained in the plug-shaped inner cavity 104. Then transferring the system from the high-pressure deep sea to the cabin or land, the two-way solenoid valve 11 connected with the accumulator is opened, all one-way solenoid valves 2 are closed, and the hydraulic pressure is stored in advance through the accumulator. When the system rises, the surrounding pressure gradually decreases, and the accumulator stabilizes the pressure on the sampling cylinder body 1, so that the pressure in the sampling cylinder body 1 can be stably maintained at the original pressure of the samples, so as to achieve the pressure maintaining effect. At the same time, since the temperature maintaining material layer 103 is fixed between the inner cylinder 102 and the outer wall 101, the sampling cylinder body 1 has a good temperature maintaining effect. Then transferring the liquid in the sampling cylinder body 1 to the storage container, connecting the transfer water outlet 5 and water inlet 6 of the plug-shaped inner cavity 104 with the transfer equipment respectively, and opening the one-way solenoid valves 2 connected to the transfer water outlet 5 and water inlet 6 respectively for sample transfer.

Embodiment 2

Figure 4:
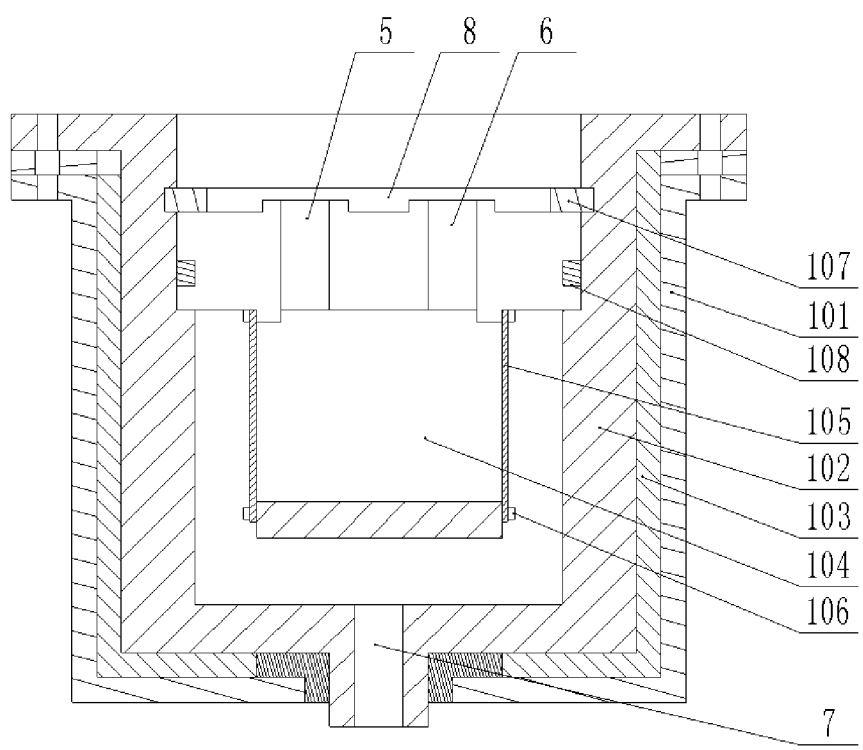
FIG. 4 is a schematic structural view of a sampling cylinder body according to a second embodiment of the disclosure.

Referring to FIG. 4, the embodiment provides a novel system for a deep-sea planktonic microorganism in-situ concentration, temperature maintaining and pressure maintaining sampling. The only difference from embodiment 1 is that the bottom of the plug-shaped inner cavity 104 is fixed with a bottom plate, the side plate of the plug-shaped inner cavity 104 is provided with a filter port, the filter port is fixedly connected with the micro biofiltration membrane 105, and the bottom plate and the side plate of the plug-shaped inner cavity 104 are fixedly provided with microbial filter membrane fixing rings 106. By setting the filter port on the side plate, it can prevent the seawater from directly impacting the microbial filter membrane 105 and damaging the microbial filter membrane 105. Since the bottom of the plug-shaped inner cavity 104 is the bottom plate, when the seawater enters the sampling cylinder body 1, it first falls on the bottom plate, and the seawater is buffered through the bottom plate, and then the seawater is filtered through the microbial filter membrane 105 on the side plate, the deep-sea microbial samples with a high concentration is left in the plug-shaped inner cavity 104. At the same time, because the large amount of seawater needs to be pumped into the sampling cylinder body 1, the concentration of microbial samples is high, and there may be microbial blockage, which may affect the filtering effect of microbial filter membrane 105 on seawater. Setting the microbial filter membrane 105 on the side plate can effectively prevent microbial sample blockage, and the microbial samples fall on the bottom plate of the sampling cylinder body 1 under the action of gravity, part of the microbial samples attached to the microbial filter membrane 105 will also fall on the bottom plate under the impact of the large amount of seawater. The filtration effect of the microbial filter membrane 105 is more stable and the service life is longer.

Embodiment 3

Figure 5:
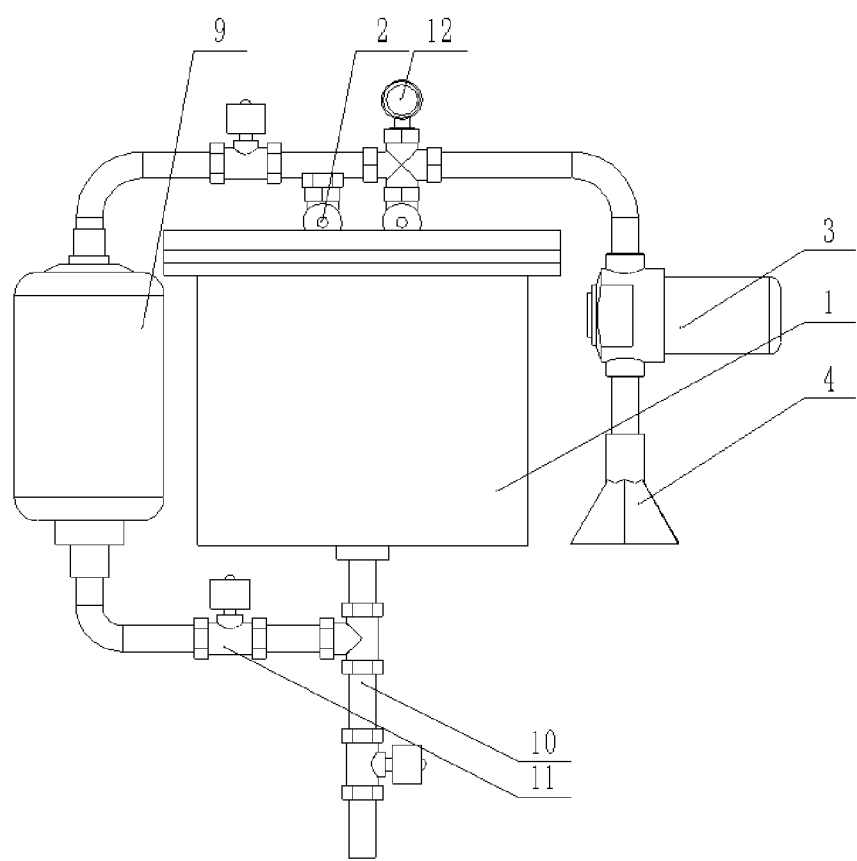
FIG. 5 is a schematic structural view of a system according to a third embodiment of the disclosure.

As shown in FIG. 5, a novel system for a deep-sea planktonic microorganism in-situ concentration, temperature maintaining and pressure maintaining sampling is provided. The only difference between this embodiment and embodiment 1 is that the deep-water pump 3 is connected to the pressure maintaining device 9. A one-way solenoid valve 2 is fixedly connected between the deep-water pump 3 and the pressure maintaining device 9. The one-way solenoid valve 2 is located between the pressure maintaining device 9 and the water inlet 6. The deep-water pump 3 can pump part of seawater into the pressure maintaining device 9 to help the pressure maintaining device store hydraulic pressure during pumping the seawater. By connecting the deep-water pump 3 with the pressure maintaining device 9, the capacity of the pressure maintaining device 9 to store hydraulic pressure can be increased. In the process of rising, if it is found that the hydraulic pressure of the pressure maintaining device 9 is insufficient and the pressure in the sampling cylinder body 1 cannot be guaranteed, the one-way solenoid valve 2 at the water inlet 6 can be closed, the one-way solenoid valve 2 at the pressure maintaining device 9 can be opened, and the deep-water pump 3 can be started to pump seawater into the pressure maintaining device 9 to store hydraulic pressure for the pressure maintaining device 9, continue to maintain the pressure in the sampling cylinder body 1, so as to prevent the large pressure change during the rise of the system due to the deep working position of the system, and the lack of stored hydraulic pressure in advance in the pressure maintaining device 9, resulting in the phenomenon that the pressure in the sampling cylinder body 1 cannot be stabilized at the initial pressure, which provides a guarantee for the microbiological samples to be in-situ pressure all the time.

In the description of the disclosure, it should be understood that the azimuth or positional relationship indicated by the terms "longitudinal", "transverse", "upper", "lower", "front", "rear", "left", "right", "vertical", "horizontal", "top", "bottom", "inner", "outer" and so on is based on the azimuth or positional relationship shown in the attached drawings for the convenience of describing the disclosure, rather than indicating or implying that the device or element must have a specific orientation, be constructed and operated in a specific orientation, it cannot be understood as a limitation of the disclosure.

The embodiments described above only describe the preferred mode of the disclosure and do not limit the scope of the disclosure. Without departing from the design spirit of the disclosure, various replacements and improvements made by those skilled in the art to the technical solutions of the disclosure shall fall within the protection scope determined by the claims of the disclosure.

What is claimed is:

1. A system for a deep-sea planktonic microorganism in-situ concentration, temperature maintaining and pressure maintaining sampling, comprising:
    a sampling cylinder body with double layer structures, wherein a bottom of the sampling cylinder body is provided with a sampling water outlet;
    a plug-shaped body, fixedly disposed in the sampling cylinder body, wherein the plug-shaped body is defined with a plug-shaped inner cavity, a top of the plug-shaped body is provided with a transfer water outlet and a water inlet;
    a water inlet assembly, connected to the water inlet;
    an end cover, fixedly connected to the top of the plug-shaped body, wherein the end cover is provided with two through holes, and the two through holes respectively correspond to the transfer water outlet and the water inlet;
    a filter part, fixedly connected to the plug-shaped body;
    a pressure maintaining device, connected to the sampling water outlet; and
    a water outlet pipe, connected to the sampling water outlet;
    wherein a temperature maintaining material layer and a temperature control component are fixedly connected between the double layer structures of the sampling cylinder body, and the temperature control component is electrically connected to a controller.

2. The system according to claim 1, wherein the double layer structures of the sampling cylinder body comprise an inner cylinder and an outer cylinder, the inner cylinder is fixedly connected to the plug-shaped body, and the temperature maintaining material layer is disposed between the outer cylinder and the inner cylinder.

3. The system according to claim 2, wherein the temperature control component comprises a plurality of temperature sensors, and the plurality of temperature sensors are located between the temperature maintaining material layer and an outer wall of the inner cylinder.

4. The system according to claim 2, wherein the plug-shaped body comprises a top plate and a side plate fixedly connected to the top plate, an inner wall of the inner cylinder is provided with a stepped groove, the top plate is matched with the stepped groove and fixedly connected to the inner cylinder, and the filter part is disposed on a bottom end of the plug-shaped body and fixedly connected to the side plate.

5. The system according to claim 4, wherein a side wall of the top plate is provided with a sealing groove at a circumferential direction, and the system further comprises an inner cavity sealing ring, fixedly arranged in the sealing groove.

6. The system according to claim 4, wherein the top plate is fixedly connected to the end cover; and
wherein the system further comprises: an inner cavity fixing ring, fixedly connected to the end cover in a circumferential direction; and
wherein the inner wall of the inner cylinder is provided with a groove matched with the inner cavity fixing ring.

7. The system according to claim 1, wherein the water inlet assembly comprises a water inlet filter and a filter screen fixedly connected to a lower end of the water inlet filter;
wherein the system further comprises:
a deep-water pump, fixedly connected to an upper end of the water inlet filter, and connected to the water inlet; and
a pressure measuring element, fixedly installed on a pipeline between the deep-water pump and the water inlet.

8. The system according to claim 1, wherein the system further comprises:
one-way solenoid valves, fixedly disposed on the transfer water outlet, the water inlet and the water outlet pipe; and
a two-way solenoid valve, fixedly connected between the pressure maintaining device and the sampling water outlet.

9. The system according to claim 1, wherein the filter part comprises:
a microbial filter membrane; and
a microbial filter membrane fixing ring, fixed at a bottom of an outer wall of the plug-shaped body;
wherein the microbial filter membrane is located between the microbial filter membrane fixing ring and the outer wall of the plug-shaped body, and the microbial filter membrane fixing ring is fixedly connected to the bottom of the outer wall of the plug-shaped body through screws.

10. The system according to claim 1, wherein the pressure maintaining device is an accumulator capable of maintaining a pressure stability of the sampling cylinder body.

* * * * *